(12) United States Patent
Jerolm et al.

(10) Patent No.: US 11,411,767 B2
(45) Date of Patent: Aug. 9, 2022

(54) MODULE UNIT FOR CONNECTING A DATA BUS SUBSCRIBER

(71) Applicant: WAGO VERWALTUNGSGESELLSCHAFT MBH, Minden (DE)

(72) Inventors: Daniel Jerolm, Bad Essen (DE); Hans-Herbert Kirste, Minden (DE); Anton Lischewski, Halle (DE); Frank Schadde, Luebbecke (DE)

(73) Assignee: WAGO Verwaltungsgesellschaft mbH, Minden (DE)

( * ) Notice: Subject to any disclaimer, the term of this patent is extended or adjusted under 35 U.S.C. 154(b) by 0 days.

(21) Appl. No.: 16/693,939

(22) Filed: Nov. 25, 2019

(65) Prior Publication Data

US 2020/0092132 A1 Mar. 19, 2020

Related U.S. Application Data

(63) Continuation of application No. PCT/EP2018/062914, filed on May 17, 2018.

(30) Foreign Application Priority Data

May 24, 2017 (DE) .................. 10 2017 208 833.8

(51) Int. Cl.
*H04L 12/40* (2006.01)
*H04L 12/42* (2006.01)
(Continued)

(52) U.S. Cl.
CPC .... *H04L 12/40006* (2013.01); *H04L 12/2859* (2013.01); *H04L 12/42* (2013.01); *H04L 12/50* (2013.01); *H04L 2012/4026* (2013.01)

(58) Field of Classification Search
CPC ......... H04L 12/40; H04L 12/42; H04L 12/50; H04L 12/28
See application file for complete search history.

(56) References Cited

U.S. PATENT DOCUMENTS

| 4,530,085 A | 7/1985 | Hamada et al. |
| 5,472,347 A | 12/1995 | Nordenstrom et al. |

(Continued)

FOREIGN PATENT DOCUMENTS

| CN | 1860742 A | 11/2006 |
| CN | 101690019 A | 3/2010 |

(Continued)

OTHER PUBLICATIONS

International Search Report dated Jul. 9, 2018 in corresponding application PCT/EP2018/062914.
(Continued)

*Primary Examiner* — Rasheed Gidado
(74) *Attorney, Agent, or Firm* — Muncy, Geissler, Olds & Lowe, P.C.

(57) ABSTRACT

A module unit for connecting a data bus participant to a local bus. The module unit has a first input interface and a first output interface which can be connected to the local bus, a first data connection interface which can be connected to the data bus participant, and a first switch which is adapted so as to assume a first or a second switch state depending on a control input from the data bus participant, connect the first input interface to the first output interface in the first switch state, and connect the first data connection interface to the first output interface in the second switch state.

19 Claims, 3 Drawing Sheets

(51) Int. Cl.
*H04L 12/28* (2006.01)
*H04L 12/50* (2006.01)

(56) References Cited

U.S. PATENT DOCUMENTS

| | | | | |
|---|---|---|---|---|
| 5,784,393 | A * | 7/1998 | Byers | G06F 11/10 |
| | | | | 714/56 |
| 5,958,033 | A * | 9/1999 | Schubert | G06F 13/4217 |
| | | | | 710/315 |
| 6,563,419 | B1 * | 5/2003 | Herz | H04L 12/403 |
| | | | | 340/12.15 |
| 6,757,777 | B1 * | 6/2004 | Griessbach | H04L 12/40202 |
| | | | | 710/316 |
| 6,922,742 | B2 | 7/2005 | Zwack | |
| 6,973,029 | B1 * | 12/2005 | Jantzen | H04L 12/40182 |
| | | | | 370/217 |
| 7,624,315 | B2 * | 11/2009 | Mysliwitz | G11C 29/48 |
| | | | | 365/201 |
| 8,170,066 | B2 | 5/2012 | Kynast et al. | |
| 8,291,142 | B2 | 10/2012 | Kuschke et al. | |
| 8,850,245 | B2 * | 9/2014 | Watroba | H04L 12/40039 |
| | | | | 713/320 |
| 8,898,364 | B2 | 11/2014 | Kuschke et al. | |
| 8,935,435 | B2 | 1/2015 | Reidt | |
| 8,972,643 | B2 * | 3/2015 | Kynast | H04L 12/437 |
| | | | | 710/307 |
| 9,772,966 | B2 | 9/2017 | Cherkaoui et al. | |
| 10,102,163 | B2 * | 10/2018 | Spiegel | G06F 13/4295 |
| 10,212,788 | B2 * | 2/2019 | Dunser | H05B 47/18 |
| 10,503,138 | B2 * | 12/2019 | Wittig | G06F 13/4072 |
| 10,599,604 | B2 | 3/2020 | Reidt | |
| 2003/0005368 | A1 | 1/2003 | Beer et al. | |
| 2005/0111372 | A1 | 5/2005 | Koestner et al. | |
| 2006/0029091 | A1 * | 2/2006 | Meyer-Graefe | H04L 12/437 |
| | | | | 370/431 |
| 2006/0092858 | A1 | 5/2006 | Kynast et al. | |
| 2007/0189323 | A1 | 8/2007 | Swoboda et al. | |
| 2014/0207994 | A1 * | 7/2014 | Cherkaoui | H04L 12/40032 |
| | | | | 710/312 |
| 2015/0134865 | A1 * | 5/2015 | Godau | G05B 15/02 |
| | | | | 710/106 |

FOREIGN PATENT DOCUMENTS

| | | |
|---|---|---|
| DE | 19929641 A1 | 1/2001 |
| DE | 20205700 U1 | 5/2003 |
| DE | 102004050423 A1 | 4/2006 |
| DE | 102004050424 A1 | 4/2006 |
| DE | 102008018633 A1 | 10/2009 |
| DE | 102013100603 B3 | 5/2014 |
| DE | 202013103146 U1 | 10/2014 |
| EP | 1213861 A2 | 6/2002 |

OTHER PUBLICATIONS

International Preliminary Report on Patentability dated Dec. 5, 2019 in corresponding application PCT/EP2018/062914.

* cited by examiner

MODULE UNIT FOR CONNECTING A DATA BUS SUBSCRIBER

This nonprovisional application is a continuation of International Application No. PCT/EP2018/062914, which was filed on May 17, 2018, and which claims priority to German Patent Application No. 10 2017 208 833.8, which was filed in Germany on May 24, 2017, and which are both herein incorporated by reference.

BACKGROUND OF THE INVENTION

Field of the Invention

The present invention relates to a module unit for connecting a data bus subscriber with a local bus, especially during operation of the local bus.

Description of the Background Art

Module units for connecting a data bus subscriber to a local bus are mostly used in automation systems. Automation systems are used in particular for the control of industrial systems, buildings and means of transport. For the control of an automation system usually several sensors and actuators are necessary. These monitor and control the process performed by the system. The different sensors and actuators of an automation system are often referred to as automation devices.

These automation devices can either be connected directly to a control unit of the automation system or can first be connected to input and output modules, which are often referred to as I/O modules. These can in turn be connected directly to the control unit. The automation devices can either be integrated directly in the I/O modules or can be connected to them via cable or wirelessly.

The control of an automation system is usually accomplished with the help of one or more programmable logic control units, PLC. The PLCs can be arranged hierarchically or decentrally in an automation system. There are different performance levels for the PLC, so that they can take over different controls and regulating techniques depending on the computing and storage capacity. A PLC in the simplest case has inputs, outputs, an operating system (firmware) and an interface through which a user program can be loaded. The user program determines how the outputs are to be switched in dependence on the inputs. The inputs and outputs can be connected to the automated devices and/or the I/O modules, and the logic stored in the user program can be used to monitor or control the process executed by the automation system. In this case, the monitoring of the process is accomplished by the sensors, and the control of the process is performed by the actuators. The control unit can also be referred to as a central control unit or central unit and assumes control of at least one automation device or I/O module connected to the control unit.

However, the direct connection of the automation devices to the at least one control unit or the I/O modules to the at least one control unit in the form of a parallel wiring, i.e., one line is routed from each automation device or from each I/O module to the higher-level control unit, is very costly. Especially with the increasing degree of automation of an automation system, the cabling effort increases with parallel wiring. This is associated with great expense in the design, installation, commissioning and maintenance.

For this reason, automation systems usually use bus systems today, with which the automation devices or the I/O modules can be connected to the control unit. In order to simplify the connection of the individual automation devices or the I/O modules with the bus system even further, today, individual groups of automation devices or I/O modules are initially interconnected to a local bus system using a specialized local bus and then at least one subscriber of this local bus is connected to the bus system, which is connected to the control unit. The local bus system can differ from the bus system, which is used to realize the connection with the control unit.

The subscriber of a group of local bus subscribers connected to the bus system of the control unit is often referred to as a local bus master. Alternatively, the term header of the local bus system is used. This local bus master can contain additional logics, circuits or functionalities to those of other local bus subscribers, which are necessary for connection to the bus system of the control unit. Also, the local bus master itself may include a PLC. This subscriber can also have logic and circuits for conversion between the two bus systems. The local bus master can therefore also be designed as a gateway or bus converter and it ensures conversion of the data present in the format of the one bus system to the format of the local bus system and vice versa. Usually, but not mandatory, the local bus master is specialized for connecting the local bus to the higher-level bus.

The local buses used are mostly tailored to the special use requirements of the automation devices or I/O modules or take into account their special hardware configuration. The groups of automation devices or I/O modules of the local bus system usually form a subgroup of the automation system for the execution of a special task in the process performed by the automation system. The data exchanged on the buses for the process is also often referred to as local bus data or process data, because this data contains information for regulating or controlling the process executed by the automation system. This data may include, but is not limited to, measurement data, control data, status data, and/or other types of information. Depending on the bus protocol used, this data may be preceded (header) or appended (tail) by other data. This other data may include information regarding the data or include information regarding internal communication on the local bus. Here, a variety of different information is known, which can be prefixed or added to the process data according to the bus protocol used. The local bus subscribers connected to a local bus can also be referred to as data bus subscribers because they exchange data on the local bus. A data bus subscriber can be used to control or monitor a process, in particular by issuing control signals to, e.g., actuators, and/or by receiving measurement signals, e.g., from sensors. The data bus subscriber converts the control signals and/or measurement signals to process data for the local bus or vice versa. The data bus subscribers can also be referred to as local bus subscribers.

An example of a local bus is a ring bus, which is a specialized form of a local bus, as is known for example from U.S. Pat. No. 5,472,347 A. In a ring bus, the data bus subscribers, for example the automation devices or I/O modules, are each connected to the data bus subscriber directly adjacent to them and data is forwarded in order from one to the other data bus subscriber. Thus, the data is not sent to all data bus subscribers at the same time, but in turn, wherein a data bus subscriber receives data from its upstream data bus subscriber and forwards data to its downstream data bus subscriber. Between receiving the data and forwarding, the data bus subscriber can process the received data. When the data has reached the last data bus subscriber in the series, the data is returned from the last data bus subscriber to the first data bus subscriber in succession. The return can be done either by all data bus subscribers or past them by means of a bypass line. The ring bus thus has a downlink and an uplink flow of data. The data in a ring bus is usually transmitted in the form of data packets that pass through all data bus subscribers.

In a closed ring bus arrangement, it is necessary for each slot of the local bus to be populated with a data bus subscriber so that data can be forwarded in sequence from one to the other data bus subscriber. If a slot is not occupied by a data bus subscriber, the bus, i.e., the downlink and/or the uplink flow, is interrupted and a forwarding or a return of the data no longer works. Also, removal of a respective plugged data bus subscriber during operation would interrupt the bus immediately.

SUMMARY OF THE INVENTION

It is therefore an object of the present invention to provide an improved module unit, which allows for a local bus to not be interrupted even with the removal of one or more data bus subscribers, but instead continues to operate.

The module unit according to an exemplary embodiment of the invention for connecting a data bus subscriber to a local bus, in particular a ring bus, has a first input interface and a first output interface, which can be connected to the local bus. That is, the first input interface and a first output interface are adapted to be connected to the local bus. The module unit according to the invention also has a first data connection interface, which can be connected to the data bus subscriber. That is, the data connection interface is adapted to be connected to the data bus subscriber. Furthermore, the module unit according to the invention has a first switch which is adapted to assume a first or a second switching state in response to a control input from the data bus subscriber, wherein in the first assumed switching state, the first input interface is connected to the first output interface and in the second assumed switching state, the first data connection interface is connected to the first output interface. That is, depending on the switching state of the switches, either the first input interface is connected to the first output interface and data is routed only through the module unit, whereas in the other switching state, data applied to the first input interface is not routed directly to the first output interface, but instead the data at the first output interface is dependent on the first data connection interface, for example, on the data that the data bus subscriber provides at said first data connection interface. For example, the switches can be adapted to adjust the respective switching states depending on whether a data bus subscriber is connected to the module unit or not. In the event that no data bus subscriber is connected to the module unit, the switches can, for example, adopt the first switching state, whereas in the case that a data bus subscriber is connected to the module unit, the switches can adopt the second switching state.

In the module according to the invention, a data bus subscriber can be removed from the local bus or a data bus subscriber can be added without interrupting the local bus for a longer period of time. It is especially advantageous in the module unit according to the invention that the data downlink is not interrupted, even if a data bus subscriber is added or removed, because in this case the module unit still establishes a connection between the first input interface and the output interface.

The module unit can have a second data connection interface which can be connected to the data bus subscriber, i.e. is adapted to be connected to the data bus subscriber, wherein the first switch is further adapted to connect the second data connection interface to the first input interface. That means that the data applied to the first input interface is routed to a second data connection interface so that it can be passed to the data bus subscriber, which can perform processing therewith. Subsequently, the data bus subscriber can output the processed data on the first data connection interface, which is connected to the first output interface, so that the processed data can be forwarded to the next module unit or the next data bus subscriber. In this case, the switch can establish the connection between the second data connection interface and the first input interface in the same switching state in which the first data connection interface is connected to the first output interface. However, it is also conceivable that the connection between the second data connection interface and the first input interface is made in a switching state located upstream or downstream of the first switching state. That is, the connection of the first data connection interface to the first output interface may be simultaneously established with the connection of the second data connection interface to the first input interface, or the corresponding connections can be made one after the other. The data sent on the local bus can be transmitted in the form of data packets. The data packets can also be referred to as telegrams. A data packet has, for example, header, payload and, advantageously, a checksum.

The local bus can be designed as a ring bus, and the first input interface is adapted to receive data, whereas the first output interface is adapted to transmit data. The first input interface receives data from an upstream data bus subscriber or an upstream module unit or from the local bus master. The output interface sends data to a downstream data bus subscriber or a downstream module unit. Reception and transmission can be passive or active. That is, for example, reception may be formed exclusively of a signal being present at the first input interface, but no signal processing taking place. In this case one can speak of passive reception. If, for example, signal processing takes place, one can speak of active reception. The same applies to transmission; if no signal processing is performed, i.e., the signal is simply provided at the first output interface, one can speak of passive transmission, whereas if signal processing is performed, one can speak of active transmission. The first input interface and the first output interface may be passive or active, i.e., perform no or some signal processing, or one of the two interfaces may be active whereas the other is passive, i.e., one performs signal processing, while the other performs no signal processing. Those skilled in the art are aware that the term signal processing may refer to any processing of a signal, such as encoding, decoding, applying modulation or de-modulation, conversion to or from one transmission format to another format, etc. This also includes the corresponding signal processing for the conversion of wired signals to wireless signals. In a ring bus, the data is sent in the form of data packets that pass through all the data bus subscribers. Data packets are sent within a cycle frame from the local bus master to the data bus subscribers.

A cycle frame can be defined, for example, as a recurring (cyclic) preferably equidistant time interval in which data can be transmitted on the local bus. The cycle frame has, for example, at least one start identifier (SOC) and a time range for transferring data. Several start identifiers (SOC) of successive cycle frames are advantageously in a temporally equidistant distance from one another. The named time range is intended for the transmission of the data packets. The start identifier (SOC) and the data packets are transmitted via the local bus and pass through all data bus subscribers. The start identifier (SOC) is separate, i.e., transferable as an independent symbol or advantageously contained in a start data packet (SOC packet).

Within the time range of the cycle frame, none, one or more data packets are transmitted. Advantageously, idle data is inserted in a cycle frame, in particular adjacent to at least one data packet. Advantageously, the transmission of the data packets and/or the idle data causes an uninterrupted signal on the local bus. The signal allows the data bus subscribers to synchronize to this time. Advantageously, the cycle frame additionally has a trailer. The trailer has a variable length and preferably follows the time range for data transmission up to the next start identifier (SOC) of the next cycle frame. Advantageously, the trailer contains idle data.

The data packets transmitted in the cycle frame are preferably generated originally by the local bus master and sent via the ring bus to the data bus subscribers. When generating, the local bus master can insert process data received from the control unit, for example a PLC, into a data packet. The data packet can also contain process data from the local bus master itself and/or from the control unit. The data packet and thus the process data contained therein then progressively pass through the individual data bus subscribers of the ring bus. In this case, the data packet may have a multiplicity of symbols, each symbol having a specific number of bits, for example 8 bits, that is to say 1 byte. The data packet accordingly passes through the data bus subscribers unit-by-unit, piecewise, or in parts, for example in the form of symbols. Accordingly, the data bus subscribers always have only a part of the data packet at any given time. Thus, if data is mentioned, it can also mean that a symbol of the data packet is currently going through the ring bus. A data packet which carries process data can also be called a process data packet. The process data packet contains the process data that is sent and/or received by the data bus subscribers of the local bus. Advantageously, the process data packet has no address for transmitting the process data to or from a data bus subscriber in the local bus. In the process data packet, the process data is arranged in such a way that data bus subscribers can recognize the process data associated with the respective data bus subscriber based on the respective position of the process data in the process data packet, for example one or more bits within an associated contiguous data block (1 byte). Advantageously, the process data packet has an identifier (IDE) which is assigned to the type of the data packet, that is to say to the process data packet, and can be identified by the data bus subscriber.

However, a data packet can also be a communication data packet which has no process data and in particular serves for programming and/or for controlling and/or for monitoring and/or for identifying at least one data bus subscriber. Advantageously, the communication data packet has an address which is assigned to at least one data bus subscriber. Preferably, the data bus subscriber is set up to evaluate the address and process the communication data packet accordingly.

The first input interface can have at least one releasable electrical contact for connection to the local bus and/or the first output interface at least one releasable electrical contact for connection to the local bus. In this case, signals can be received from the upstream data bus subscriber or the upstream module unit via the one electrical contact of the first input interface and signals can be sent to the downstream data bus subscriber or the downstream module unit via the one electrical contact of the first output interface. The sending and receiving can be done passively or actively. The person skilled in the art is also aware that the interfaces can also have a different number of contacts and the number depends only on the specific embodiment of the local bus. The person skilled in the art is also aware that the contacts can be designed as plug-in, cutting or other contacts with which an electrically conductive connection can be established. It is also conceivable that an optical connection is made. The fact that the contacts are detachable means that they do not make a firm connection, but instead can be separated again by exerting a certain force.

The first data connection interface and/or the second data connection interface in each case can have at least one releasable electrical contact for connection to the data bus subscriber. In this case, the second data connection interface may be adapted to send signals to the data bus subscriber via the contact, wherein this transmission may be passive or active, and the first data connection interface may be adapted to receive signals from the data bus subscriber, wherein this receiving may be passive and active. The person skilled in the art is also aware that the interfaces can also have a different number of contacts and the number depends only on the specific design of the data bus subscribers. The person skilled in the art is also aware that the contacts can be designed as plug-in, cutting or other contacts with which an electrically conductive connection can be established. It is also conceivable that an optical connection is made.

The module unit can have at least one connecting element in order to be connected with another module unit, wherein the first output interface of the module unit is electrically connected to a first input interface of the further module unit, or the first input interface of the module unit is electrically connected to a first output interface of the other module unit. The connecting element can produce a mechanical connection between the two module units, wherein the connection can be released only by applying a certain force. Accordingly, it can also be said that the connecting element is a mechanical connecting element. The mechanical connecting element can be formed, for example, by virtue of the module units having latching hooks on one side and recesses or undercuts on the opposite side, so that when two module units are arranged next to one another, the latching hooks of a module unit engage in the recesses or the undercuts of the other module unit, so that they can be mechanically but releasably connected. However, the person skilled in the art also knows of other possibilities as to how two modular units can be releasably mechanically connected to each other and which geometries must be arranged for this purpose on the module units. When connecting the module units, the connecting element is designed such that with the connection of the module units, an electrical connection of the interfaces also takes place. In this case, the first output interface of the one module unit is electrically connected to the first input interface of the other downstream module unit. The connecting element then ensures that the module units can only be again detached from the other by applying a certain force, which exceeds the holding force of the connecting element, and therefore, the electrical connections are again released. The module units can also be adapted such that they can be arranged side by side on a DIN rail and the connecting element can be configured such that this fixes the module unit on the DIN rail, so that another module unit with its connecting element can be directly fixed to the module unit already fixed on the DIN rail. As a result, several module units can be arranged next to one another and fixed on the DIN rail. In this case, the at least one contact of the first output interface of the one module unit can be brought into contact with the first input interface of the downstream, directly adjacent module unit so as to establish an electrical connection.

The module unit can have at least one connecting element in order to be connected to a data bus subscriber, wherein the first data connection interface and/or the second data connection interface are electrically connected to the data bus subscriber. The connecting element can be configured at least such that this allows for a releasable mechanical connection of the data bus subscriber to the module unit. For example, this can be realized by suitable plug-in or clamp connection elements on the module unit and on the data bus subscriber, so that the data bus subscriber can only be detached again from the module unit when a holding force provided by these elements is applied. It is also conceivable that securing elements are used, which prevent the inadvertent release of the data bus subscribers, for example, when strong vibrations are present. These securing elements can be released, for example, only with a tool or represent an additional holding force. When the data bus subscriber is connected to the module unit, then the first and/or second data connection interfaces are also connected to the data bus subscriber, which comprises corresponding complementary contacts. This can be realized with appropriate plug or terminal contacts.

The module unit can have a second input interface and a second output interface for connection to the local bus. These interfaces form the uplink connection of the local bus, allowing for signals received by a downstream data bus subscriber or a downstream module unit at the second input interface to be sent to an upstream data bus subscriber or module unit via the second output interface. The sending and receiving can be done passively or actively. In a simple embodiment, the module unit can have a direct electrically or optically conductive connection between the second input interface and the second output interface. That means, in this embodiment, the data is passed in the uplink direction only through the module unit. Alternatively, the module unit can also have a third and a fourth data connection interface for connection to the data bus subscriber, and a second switch, which is adapted to assume a first or a second switching state in response to the control input from the data bus subscriber and to connect the second input interface with the second output interface in the first switching state and to connect the third data connection interface with the second input interface and/or the fourth data connection interface with the second output interface in the second switching state. That is, in this embodiment, signals coming in the uplink direction from the downstream data bus subscriber or the downstream module unit can also be processed by the data bus subscriber. This has the advantage in particular in a ring bus that the symbols of the data packet passing through the data bus subscriber can be processed twice, namely once when they are sent in the downlink direction and the second time when they are transmitted in the uplink direction.

The first and/or second switch can be electrically controllable. That is, the control input is an electrical signal and according to the electrical signal, the first and/or second controller assume a corresponding switching state. The term "the first and/or the second switch" means that at least one of the switches can be designed in such a manner. If there is only a first switch, this is designed such a manner. If the module unit comprises a plurality of switch, at least one of the switches is configured in such a way, but preferably all switches are designed in such a way. Both switches can be acted upon by the same control signal, so that both switches are controlled simultaneously, or the switch can be acted upon by different control signals. The control signal can, for example, be generated by the data bus subscriber itself and only generated when a specific condition has occurred. For example, both switches may initially be in the first switching state, i.e., provide a forwarding of signals in the downlink and uplink direction. When the data bus subscriber is connected with the module unit, for example, this can immediately provide a control signal, which causes the switch to change to the second switching state so that the signals are no longer routed past the data bus subscriber but instead can be processed by this. However, it may also be that the data bus subscriber first takes a certain amount of time before it is ready for communication or ready to process, and a control signal is sent to the module unit only after this time, so that only when there is communication readiness or processing readiness, the data is passed to the data bus subscriber. The control signal itself may be any signal capable of transporting information from the data bus subscriber to the switch. For example, this information can be transported by means of an electrical or optical signal. The control signal can be, for example, a binary signal, which only indicates whether or not a switching state should be assumed. In this case, the first and/or the second switch may be at least one electromechanical switch. For example, the first and/or the second switch may be a relay with an electromagnet, which is designed such that the electrical control signal can actuate the relay. The electromechanical switch can be located in or on the module unit. The first and/or the second switch may alternatively also be an electronic switch. The switch can be realized in the form of a semiconductor device, such as a field effect transistor, bipolar transistor or a diode circuit. The electronic switch can be switched by means of the electrical control signal. Advantageously, electronic switches have a shorter switching time than electromechanical switches and are also free of bounce and wear. The electronic switch can also be located in or on the module unit.

The first and/or second switch can be mechanically controllable. That is, the control input is a mechanical input and according to the input, the first and/or second controller assumes a corresponding switching state. That is, the switch is mechanically transferred from the first to the second switching state. For example, this can be done by a geometry arranged on the data bus subscriber which, when the data bus subscriber is arranged on the module unit, switches the switch from a first switching state to a second switching state. If the data bus subscriber with the corresponding geometry is then again removed, the switch can be transferred back again from the second switching state to the first switching state. For this purpose, the geometry may be designed, for example, pin-shaped to change the switching state in a suitably designed switch.

The first and/or second switch can be optically controllable. That is, the control input is an optical signal and according to the signal, the first and/or second controller assumes a corresponding switching state.

The first switch and/or the second switch can be adapted to assume the first switching state when there is no control input, in particular if no data bus subscriber is connected to the module unit. That is, if no data bus subscriber is connected to the module unit, there is no control signal, or there is no geometry that causes a switching state. In this case, the first switching state is preferred, which allows a passage of the signals on the local bus in the downlink and uplink direction. The module unit provides a passage in this case. For example, this can be done by establishing a low impedance path or a conductive path between the input and output interfaces.

The first switch and/or the second switch can be adapted in the first switching state to connect the second data connection interface and/or the third data connection interface to a fixed potential. That is, a reference potential is created.

The module unit may have a housing made of plastic or another non-conductive material, so that the interfaces are electrically insulated from the environment. In this case, the housing may for example be adapted to receive the data bus subscriber in a supporting manner. Furthermore, the housing may be adapted to fix the module unit to a DIN rail.

The module unit can have a voltage connection interface for connecting a voltage source to the data bus subscriber. The voltage connection interface may be similar to the data connection interfaces, so that releasably connecting the data bus subscriber to the module unit is possible. The voltage connection interface provides the data bus subscriber with voltage so that the data bus subscriber can be operated. The associated voltage source can be located in or on the module unit or be arranged outside the module unit.

The module unit can have a control input interface for receiving the control input from the data bus subscriber. The control input interface may also be designed similar to the data connection interfaces and the voltage connection interface to allow for the releasable connection of the data bus subscriber to the module unit.

Further scope of applicability of the present invention will become apparent from the detailed description given hereinafter. However, it should be understood that the detailed description and specific examples, while indicating preferred embodiments of the invention, are given by way of illustration only, since various changes, combinations, and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
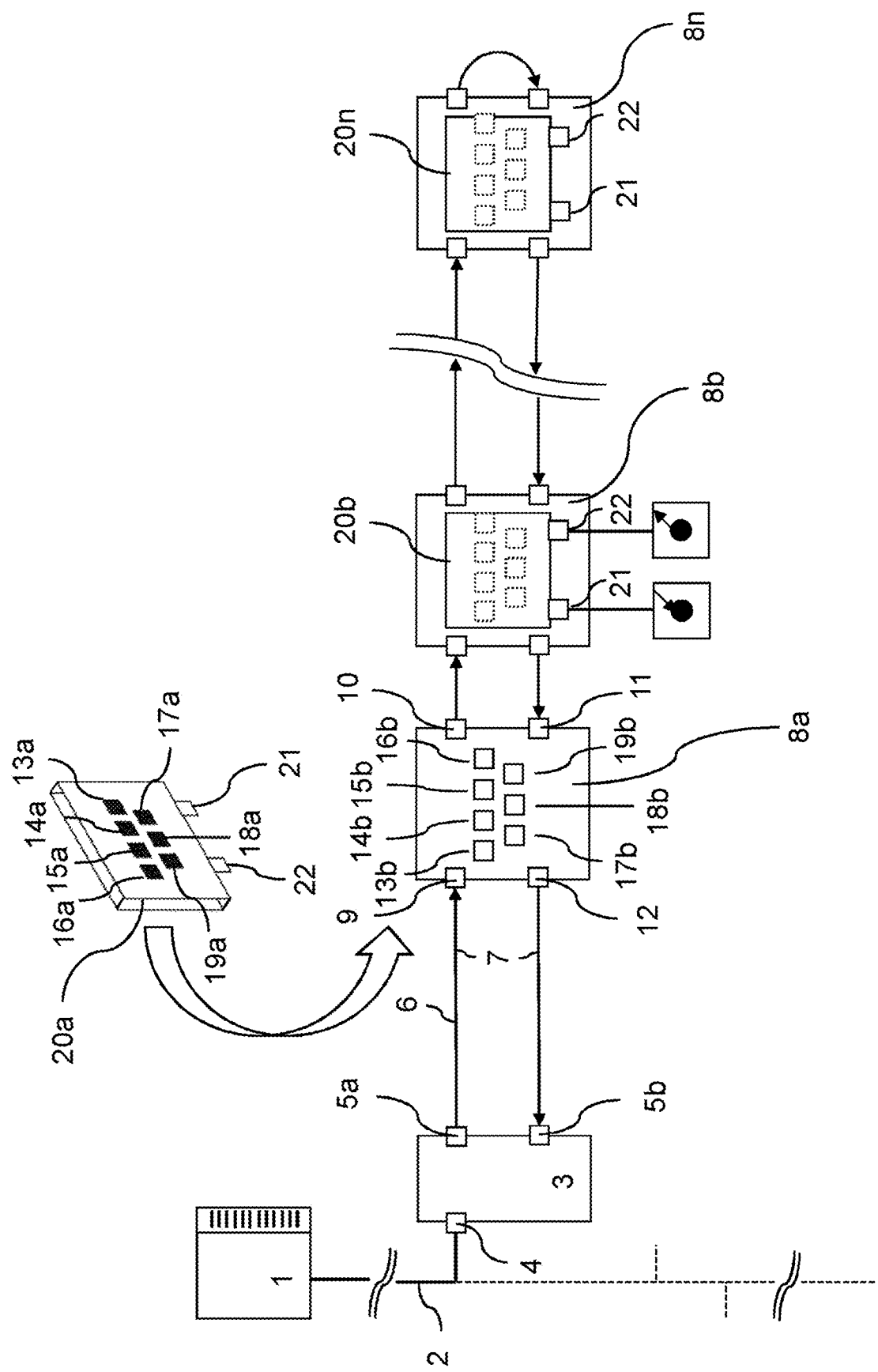
FIG. 1 is a schematic block diagram of an exemplary automation system with a programmable logic control unit, a higher-level bus, an embodiment of the module unit according to the invention, and an exemplary ring bus.

FIG. 1 shows a schematic block diagram of an automation system. It will be understood by those skilled in the art that the automation system shown is only an example and all the elements, modules, components, subscribers and units belonging to the automation system can be configured differently but can nevertheless fulfill the basic functions described here.

The automation system shown in FIG. 1 has a higher-level control 1, which can be realized, for example, with a programmable logic control unit, PLC. Such a PLC 1 basically serves to control and regulate the process performed by the automation system. However, PLCs 1 in automation systems today also take on more advanced functions, such as visualization, alerts and recording of all data relating to the process, and as such, the PLC 1 functions as a human-machine interface. There are PLC 1 of different performance levels which have different resources (computing capacity, memory capacity, number and type of inputs and outputs, and interfaces) that enable the PLC 1 to control and regulate the automation system process. A PLC 1 usually has a modular design and formed of individual components, each fulfilling a different task. Usually, a PLC 1 includes a central arithmetic unit (with one or more main processors and memory modules) and several modules with inputs and outputs. Such modular PLCs 1 can be easily expanded by adding modules. It depends on the complexity of the process and the complexity of the structure of the automation system as to which modules must be integrated in the PLC 1. In today's automation systems, the PLC 1 is also usually no longer an independent system, but the PLC 1 is connected via appropriate interfaces to the Internet or intranet. This means that the PLC 1 is part of a network via which or from which the PLC 1 can obtain information, instructions, programming, etc. For example, via a connection to a computer located on the intranet or the Internet, the PLC 1 may receive information about the materials supplied to the process, such that, for example, by knowing their number or nature, the process can be optimally controlled. It is also conceivable that the PLC 1 is controlled by a user via access from the intranet or Internet. For example, a user using a computer, also called a host computer, can access the PLC 1 and check, change or correct its user programming. Accordingly, access to the PLC 1 from one or more remote stations or control centers is possible. If necessary, the host computers can have visualization devices for displaying process sequences.

To control the process of the automation system, the PLC 1 is connected to automation devices. In order to keep the wiring costs low, bus systems are used for these connections. In the exemplary embodiment shown in FIG. 1, the PLC 1 is connected to a local bus master 3 of a subordinate local bus system by means of a higher-level bus 2, which in the exemplary embodiment shown here can be a field bus. However, not only a local bus master 3 of a local bus can be connected to the higher-level bus 2 as in the embodiment shown here, but also any other subscriber which is designed to communicate with the PLC 1.

The higher-level bus 2 is connected to the local bus master 3 in the exemplary embodiment shown here. For this purpose, the local bus master 3 has a first interface 4, which is designed such that it can be connected to the higher-level bus 2. For this purpose, the interface 4 can have, for example, a receptacle in the form of a socket and the higher-level bus 2 can have a plug which can be received by the socket. The plug and socket may be, for example, a modular plug and a modular socket, i.e., each wire of the higher-level bus 2 is electrically or optically connected in the modular socket. However, the person skilled in the art also knows other ways in which an interface 4 is to be designed so that the local bus master 3 can be electrically or optically connected to the higher-level bus 2. The person skilled in the art is aware of screw, turn, click or plug connections, with the help of which an electrical or optical connection can be made. In most cases, a male plug is accommodated by a female counterpart. This receiving usually does not only produce the electrical or optical connection, but also ensures that the two parts are mechanically coupled and can only be released from each other again with the application of a certain force. But it is also conceivable that the higher-level bus 2 is hardwired to the interface 4.

The local bus master 3 in the exemplary embodiment shown here has a further second interface in order to connect the local bus master 3 to the local bus, wherein the local bus in the embodiment shown here is designed as a ring bus 6. In this case, the second interface is divided into a first part 5a and a second part 5b. The first part 5a of the second interface establishes the downlink in the ring bus 6 and the second part 5b of the second interface establishes the uplink in the ring bus 6.

The ring bus 6, whose data transmission direction is shown with arrows in the exemplary embodiment shown in FIG. 1, has a plurality of module units 8a, 8b, . . . , 8n for connection to data bus subscribers 20a, 20b, . . . , 20n in the exemplary embodiment shown here.

A data packet which is sent from the local bus master 3 to the local bus 6 passes through all module units 8a, 8b, . . . , 8n and to the data bus subscribers 20a, 20b, . . . , 20n connected thereto. In this case, a data bus subscriber 20a, 20b, . . . , 20n always receives only a part of the data packet from its upstream data bus subscriber 20a, 20b, . . . , 20n or from a module unit 8a, 8b, . . . , 8n. After a period of time in which the data contained in this part can be processed by the data bus subscriber 20a, 20b, . . . , 20n, the part is forwarded to the downstream data bus subscriber 20a, 20b, . . . , 20n and at the same time, the upstream data bus subscriber 20a, 20b, . . . , 20n or module unit 8a, 8b, . . . , 8n receives a new part of the data packet. In this way, all parts of the data packet pass sequentially through all data bus subscribers 20a, 20b, . . . , 20n or module units 8a, 8b, . . . , 8n. The local bus is advantageously formed in an annular structure. Such local buses can also be referred to as a ring bus 6. Alternatively, the local bus can also be formed in a strand-shaped or star-shaped manner or from a combination or mixed form of the aforementioned. The module units 8a, 8b, . . . , 8n can also be referred to as basic elements of the ring bus 6. The ring bus infrastructure is thereby constructed by the module units 8a, 8b, . . . , 8n and the data bus subscribers 20a, 20b, . . . , 20n are interchangeable, so that the ring bus 6 can be constructed with any data bus subscriber 20a, 20b, . . . , 20n. With the aid of the module units 8a, 8b, . . . , 8n, it is also ensured that even if a data bus subscriber 20a, 20b, . . . , 20n is removed, the communication between the remaining data bus subscribers 20a, 20b, . . . , 20n is not interrupted because communication takes place via the still existing module units 8a, 8b, . . . , 8n.

In the exemplary embodiment shown here, the module units 8a, 8b, . . . , 8n each have a first input interface 9 for receiving data from a subscriber upstream of or preceding the ring bus 6, for example from an upstream module unit, a data bus subscriber or a local bus master 3. The receiving may be active or passive, i.e., signal processing can take place or not. In the case of the module unit 8a shown, this receives data from the upstream local bus master 3 via the first input interface 9. Furthermore, in the exemplary embodiment shown here, the module units 8a, 8b, . . . , 8n each have a first output interface 10 in order to transmit data to a downstream or subsequent module unit and/or a data bus subscriber. In the case of module unit 8a, this transmits data via the first output interface 10 to the downstream module unit 8b with the data bus subscriber 20b attached thereto. The transmission can be active or passive, i.e., signal processing may or may not take place. The first input interface 9 and the first output interface 10 serve to propagate data in the downlink direction of the ring bus 6, i.e., away from the local bus master 3. Furthermore, the module units 8a, 8b, . . . , 8n also have a second input interface 11 and a second output interface 12 which serve to propagate data in the uplink direction of the ring bus 6, i.e., towards the local bus master 3. In the case of the module unit 8a, the second input interface 11 is designed to receive data from the downstream or subsequent module unit 8b with or without data bus subscriber 20b arranged thereon and the second output interface 12 is designed to forward data to the upstream or the preceding module unit and/or data bus subscriber, here the local bus master 3. It can thus be said that the output interfaces 10 and 12 are transmitter interfaces, whereas the input interfaces 9 and 11 are receiver interfaces.

Even if the local bus master 3 and the individual module units 8a, 8b, . . . , 8n with or without attached data bus subscribers 20a, 20b, . . . , 20n are shown spaced apart in the embodiment shown here, the local bus master 3 can also be arranged decentralized of the module units 8a, 8b, . . . , 8n. As the skilled person knows, the module units 8a, 8b, . . . , 8n and the local bus master 3—which also represents a data bus subscriber of the ring bus 6—can also be directly connected to each other. For example, contacts of a module unit 8a, 8b, . . . , 8n can engage in corresponding receptacles or receptacle contacts of a directly adjacent module unit 8a, 8b, . . . , 8n so as to establish an electrical or optical connection between the module units 8a, 8b, . . . , 8n so as to transmit data in the downlink and uplink directions. For example, the module units 8a, 8b, . . . , 8n may have receptacles on the side facing away from the master and contacts on the side facing the master. If the module units 8a, 8b, . . . , 8n are then corresponding strung together, the contacts of the one module unit 8a, 8b, . . . , 8n respectively engage in the receptacles of the other module unit 8a, 8b, . . . , 8n and an electrical or optical connection can be established. The local bus master 3 then has corresponding contacts on the side which engages in the receptacles of the first module unit 8a so as to establish an electrical or optical connection between the interfaces 5a and 9 or the interfaces 5b and 12, respectively. However, other possibilities are also known to the person skilled in the art, e.g., pressure contacts, blade and fork contacts, as to how two directly adjacent module units 8a, 8b, . . . , 8n can establish an electrical or optical connection. The module units 8a, 8b, . . . , 8n shown separately in FIG. 1 can also be arranged in a common housing so that their respective first and second input and output interfaces 9 to 11 are firmly interconnected inside the housing, for example by means of conductor tracks.

In the case that the module units 8a, 8b, . . . , 8n and the local bus master 3 are to be connected directly to each other, they can also have mechanical receptacles or mechanical connection elements with which the individual module units 8a, 8b, . . . , 8n and the local bus master 3 can be interconnected. Here, for example, a module unit 8a, 8b, . . . , 8n may have a projection on one side and an undercut on the other side. If the module units 8a, 8b, . . . , 8n are then lined up, a projection engages in an undercut of the other module unit 8a, 8b, . . . , 8n, so that a mechanical coupling is produced. For simple juxtaposition of the module units 8a, 8b, . . . , 8n, these can also be arranged on a common receptacle, for example a DIN rail. For mounting on the DIN rail, the module units 8a, 8b, . . . , 8n can have a corresponding fastener. Alternatively, or additionally, the module units 8a, 8b, . . . , 8n, for example, can also have a releasable fastener with which the module units 8a, 8b, . . . , 8n can be mounted either on the DIN rail or on another receptacle. For this purpose, the releasably connectable fastener can be interchangeable and a corresponding fastener for the desired receptacle can be connected with the module units 8a, 8b, . . . , 8n so that they can be attached to the desired receptacle.

The data bus subscribers 20a, 20b, 20n that can be attached to or plugged onto the module units 8a, 8b, . . . , 8n interconnect via data connection interfaces 13a, 14a, 15a, 16a with corresponding data connection interfaces 13b, 14b, 15b, 16b on the module units 8a, 8b, . . . , 8n.

The data connection interfaces 13b, 14b, 15b, 16b on the module units 8a, 8b, . . . , 8n are in turn connected to the first and second input and output interfaces 9, 10, 11, 12. The data bus subscribers 20a, 20b, 20n have, for example, an arithmetic logic unit or another type of arithmetic core with the aid of which data can be processed. This processing unit can be a processor, a microcontroller or an arithmetic circuit, which may be formed in particular of gate elements of an integrated circuit. The arithmetic circuit may be formed as a digital logic, which is in particular designed at least as a part of a semiconductor chip. The circuits may be implemented in an application specific integrated circuit (ASIC) or in a field programmable (logic) gate array (FPGA). The data bus subscribers 20a, 20b, 20n may be configured to process data received from the ring bus 6 and to output data. The data to be processed can be received either from an upstream data bus subscriber 20a, 20b, 20n, from the local bus master 3 or from subscriber inputs 21 of the data bus subscriber 20a, 20b, 20n. The subscriber inputs 21 of data bus subscriber 20b may be connected to sensors that send, for example, measurement data, status data, etc. Processed data can be output either to a downstream data bus subscriber 20n or to the subscriber outputs 22 of the data bus subscriber 20b. The subscriber outputs 22 of the data bus subscriber 20b can be connected to actuators, which, for example, carry out a specific action with the aid of the data routed to them.

The data bus subscribers 20a, 20b, 20n shown in this embodiment are also often referred to as I/O modules due to their inputs and outputs 21, 22, which can be connected to sensors or actuators. Even if the data bus subscribers 20a, 20b, 20n in the embodiment here are shown as spatially separated from the sensors or actuators, the sensors or actuators can also be integrated in the data bus subscribers 20a, 20b, 20n.

The different interfaces 9 to 19 on the module units 8a, 8b, 8n, which are explained in detail in connection with FIG. 2, can have, for example, a receptacle in the form of a socket and the respective connecting elements, such as the connecting lines 7 of the ring bus 6 can each have a plug, which can be received by the socket. However, the person skilled in the art also knows of other ways in which the interfaces 9 to 19 are to be designed so that the respective connecting elements can be electrically or optically connected to the interfaces 9 to 19. The person skilled in the art is aware of screw, turn, click or plug connections, with the help of which an electrical or optical connection can be made. In most cases, a male plug is accommodated by a female counterpart. This receptacle usually does not only establish the electrical or optical connection, but also ensures that the two parts are mechanically connected and can only be released from each other again with the expenditure of a certain force. Furthermore, it is known to the person skilled in the art that not all interfaces 9 to 19 must be the same type. For example, some of the interfaces 9 to 19 may be designed as a plug connection, with other interfaces 9 to 19 being designed as screw connections.

The different interfaces 9 to 19 on the module units 8a, 8b, 8n, as shown by way of example in FIG. 1 for the modular unit 8a, can be arranged in any desired position and in any order on the housing of the module unit 8a. Further, interfaces may be attached to the module units 8a, 8b, 8n, by means of which further data can be exchanged between the module units 8a, 8b, 8n and the data bus subscribers 20b, 20n arranged thereon. Furthermore, further interfaces can also be attached to the module units 8a, 8b, 8n in order to exchange data between the module units 8a, 8b, 8n, such as, for example, a status signal looped through all the module units 8a, 8b, 8n.

Figure 2:
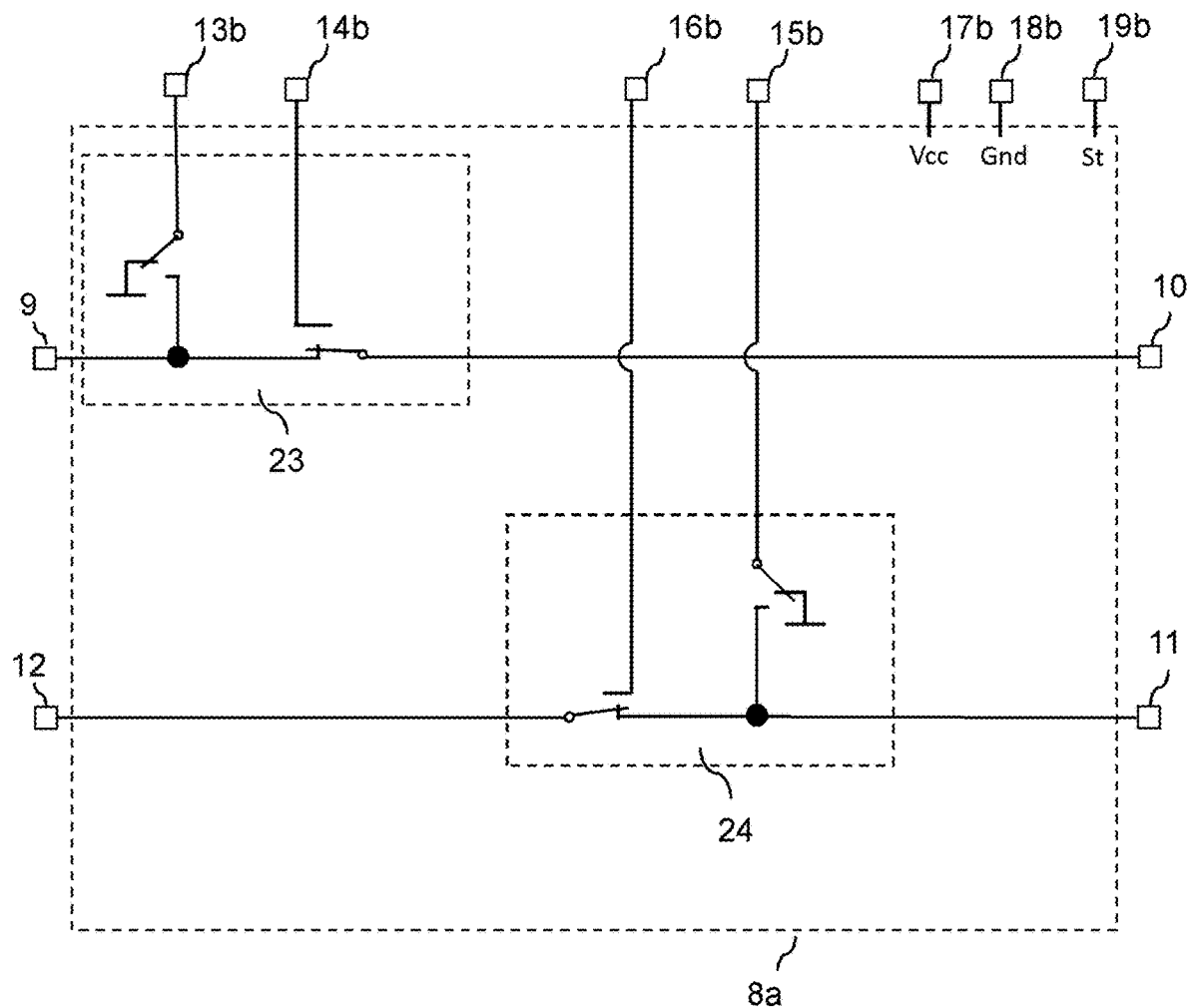
FIG. 2 is a schematic circuit diagram of an embodiment of the module unit according to the invention without a data bus subscriber arranged thereon with the switch in the first switching state.

FIG. 2 shows an exemplary embodiment of a module unit without a data bus subscriber arranged thereon with the switch 23, 24 in the first switching state. The module unit 8a shown in FIG. 2 is the module unit 8a shown in FIG. 1. However, the module unit 8a shown in FIG. 2 can also be any of the other module units 8a, 8b, . . . , 8n from FIG. 1. As shown in FIG. 1, the module unit 8a is connected to the first input interface 9 to the local bus master 3 and to the first output interface 10 to the module unit 8b. This direction forms the downlink direction for the data in the ring bus 6, i.e., the direction away from the local bus master 3. The second input interface 11 of the module unit 8a is connected to the module unit 8b, and the second output interface 12 is connected to the local bus master 3. This direction forms the uplink direction for data in the ring bus 6, i.e., towards the local bus master 3. In the ring bus 6, the data in the downlink and uplink directions are routed to an upstream or downstream subscriber by a subscriber—a subscriber can be a module unit 8a, 8b, . . . , 8n with or without a data bus subscriber 20a, 20b, . . . , 20n arranged thereon or just a data bus subscriber 20a, 20b, . . . , 20n. As has already been described with regard to FIG. 1, in order for the ring bus 6 not to be interrupted, the data must be able to be routed from one subscriber to another. In order to ensure the operability of the ring bus 6, the data in the uplink direction and in the downlink direction needs to be looped through the module units 8a, 8b, . . . , 8n, or forwarded without interruption, even if, for example, no data bus subscriber 20a is mounted on the module unit 8a. For this purpose, the module unit 8a has a first switch 23 for the downlink direction and a second optional switch 24 for the uplink direction. As shown in FIG. 2, the first switch 23 switches the downlink direction and the second switch 24 switches the uplink direction. In this case, the first switch 23 switches the downlink direction such that in the first switching state shown in FIG. 2, the first input interface 9 of the module unit 8a is electrically or optically conductively connected to the first output interface 10. The data starting from the local bus master 3 is accordingly conducted directly in the downlink direction through the module unit 8a to the module unit 8b. The second switch 24 optionally shown here switches the uplink direction such that in the first switching state shown in FIG. 2, the second input interface 11 of the module unit 8a is electrically conductively connected to the second output interface 12. The data coming from the module unit 8b is forwarded directly to the local bus master 3. As an alternative to the second switch 24, a direct connection between the second input interface 11 and the second output interface 12 may also be present.

In the embodiment shown here, the first and second switch 23, 24 are either electronic switches or electromechanical switches. The person skilled in the art is aware that the respective switches 23, 24 can be constructed of one or more electronic switches or electromechanical switches. For example, the respective switches 23, 24 may be constructed of a relay having a plurality of relay contacts, such as a plurality of normally closed and normally open contacts. The switches 23, 24 can either be formed of semiconductor elements or of relays and can be controlled by the control input in the form of an electrical control signal. However, it is also known to the person skilled in the art that the first and the second switch 23, 24 may also be mechanical switches, which can switch between the first and the second switching state in response to a mechanical control input, such as a pin-shaped geometry mounted on the data bus subscriber 20a.

As shown in FIG. 2, the module unit 8a has a control input interface 19b for receiving the control input, for example a control signal, from a data bus subscriber 20a and/or for forwarding the control input to the switch 23, 24. In the example shown in FIG. 2, the control input controls all shown switches 23, 24 simultaneously. This means that all switches in the switches 23, 24 switch simultaneously in response to the control input, so that depending on the control input, the switches 23, 24 respectively assume either the defined first switching state or the defined second switching state. The switches 23, 24 can also be switched in succession. In the embodiment shown in FIG. 2, the switches 23, 24 are in the first switching state. The switches 23, 24 can assume this first switching state, for example, if there is no control input, for example if no data bus subscriber 20a is connected to the module unit 8a. As already described above, the ring bus 6 is thereby not interrupted in the absence of a data bus subscriber 20a, or in the absence of a control input of the data bus subscriber 20a. That is, in the event of an error of the data bus subscriber 20a, for example, the first switching state can be assumed because a corresponding control input is missing. This error may be that the data bus subscriber 20a is no longer able to process the signals, or the data bus subscriber 20a no longer provides correct outputs or has mechanically at least partially detached from the module unit 8a, so that not all contacts exist anymore.

The switches 23, 24 may be integrated in the module unit 8a or located outside the module unit 8a. Furthermore, FIG. 2 shows that at least one data connection interface 13b, 15b per switches 23, 24 is switched to ground in the first switching state. This allows for a defined zero signal to be applied in the first switching state at least at the two data connection interfaces 13b, 15b. However, it is known to the person skilled in the art that the switches 23, 24 function according to the invention even without grounding the data connection interfaces 13b, 15b in the first switching state. The data connection interfaces 14b and 16b shown in the embodiment of FIG. 2 are not connected.

FIG. 2 also shows that the module unit 8a continues to provide a voltage connection interface 17b, 18b for connecting a voltage source to the data bus subscriber 20a. Similar to the other interfaces, the voltage connection interface 17b, 18b may be arranged on the module unit 8a so that a detachable connection of the data bus subscriber 20a to the module unit 8a is possible. When a data bus subscriber 20a is arranged on the module unit 8a, the voltage connection interface 17a, 18a can supply the data bus subscriber 20a with voltage, so that the data bus subscriber 20a can be operated. It is known to the person skilled in the art that the respective voltage source can be located in the module unit 8a or can be arranged outside the module unit 8a.

Figure 3:
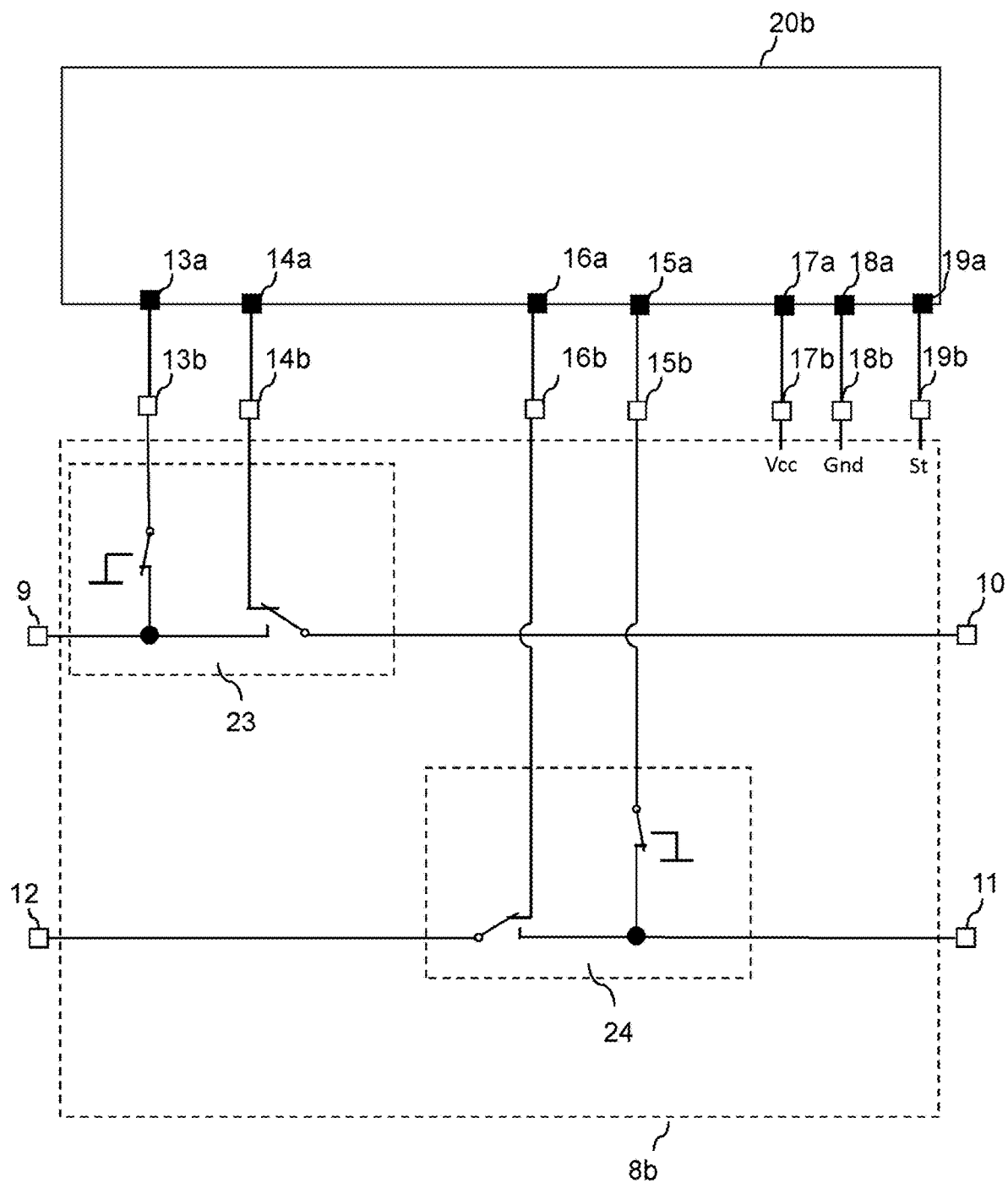
FIG. 3 is a schematic circuit diagram of an embodiment of the module unit according to the invention with a data bus subscriber arranged thereon with the switch in the second switching state.

FIG. 3 shows a schematic circuit diagram of an embodiment of a module unit 8b with a data bus subscriber 20b attached thereto with the switches 23, 24 in the second switching state. The module unit 8b shown in FIG. 3 is the module unit 8b already shown in FIG. 1 with a data bus subscriber 20b arranged thereon. However, the module unit 8b shown can also be the module unit 8a already shown in FIG. 2 with a data bus subscriber 20a attached thereto, or, for example, the module unit 8n shown in FIG. 1.

As already described with regard to FIG. 1, the different interfaces 9 to 19 on the module unit 8b can be designed differently. In the exemplary embodiment shown in FIG. 3, the interfaces 13b to 19b which connect the data bus subscriber 20b to the module unit 8b can be designed as plug-in connections, so that the data bus subscriber 20b can simply be plugged by hand onto the modular unit 8b without the use of tools. For this purpose, the data bus subscriber 20b may have interfaces which correspond to the interfaces 13b to 19b of the module unit 8b and which can be connected to the interfaces 13b to 19b.

The advantage of the module unit 8b is that the data bus subscriber 20b can be arranged on the module unit 8b during ongoing operation of the bus. As already described above, this can be done by plugging the data bus subscriber 20b onto the module unit 8b. After all the interfaces 13b to 19b are connected and the data bus subscriber 20b is supplied with voltage, for example via the voltage connection interface 17b, 18b, the data bus subscriber 20b can immediately relay a control input in the form of an electrical signal via the control input interface 19b to the module unit 8b, so that the switches 23, 24 switch from the first switching state to the second switching state. However, the data bus subscriber 20b can also relay the control input at a later time via the control input interface 19b. For example, after it has been initialized, or after an input of the data bus subscriber 20b has been connected, as described with respect to FIG. 1.

In the embodiment shown in FIG. 3, the control input in the form of an electrical signal is present at the control input interface 19b as long as the data bus subscriber 20b is connected to the module unit 8b. Alternatively, additionally a suitable electronic circuit can also be used, which allows the switches 23, 24 to switch back and forth between the first and the second switching state as a function of short switching pulses originating from the module unit 18b.

In the second switching state shown in FIG. 3, the first data connection interface 13b is connected to the first input interface 9 and the second data connection interface 14b is connected to the first output interface 10, the third data connection interface 15b is connected to the second input interface 11 and the fourth data connection interface 16b is connected to the second output interface 12. In the second switching state, there is no direct connection in the module unit 8b between the respective input and output interfaces, as shown in FIG. 3. Instead, the uplink and downlink operation [sic—should "Verrichtung" be "Richtung", i.e. "direction"?] of the ring bus 6 via the data connection interfaces 13b to 16b is looped through the data bus subscriber 20b. The data bus subscriber 20b may perform processing with the looped data in the uplink and/or downlink operation [sic—should "Verrichtung" be "Richtung", i.e. "direction"?] before forwarding it to the corresponding output interface 10 or 12.

In the last module unit 8n arranged in the ring bus 6, the second switch 24 can also utilize the switching state shown in FIG. 3 to loop data coming from the downlink direction through the data bus subscriber 20*n* and to then send it back to the uplink direction. In this case, no bridge unit is needed on the last module unit 8*n*, which would otherwise connect the first output interface 10 to the second input interface 11.

The module unit 8*b* also allows for the data bus subscriber 20*b* to be removed during operation. After the data bus subscriber 20*b* has been removed again from the module unit 8*b* and the terminal of the data bus subscriber 20*b* has been disconnected from the control input interface 19*b*, the control input is also removed, or the control signal is set to zero. This has the consequence of the switches 23, 24 again assuming the first switching state, as shown in FIG. 2, and a passage taking place in the downlink and uplink direction.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A connection module connecting a data bus subscriber to a local bus, the connection module comprising:
    a first input interface and a first output interface connectable to the local bus;
    a first data connection interface connectable to the data bus subscriber; and
    a first switch adapted to:
        switch between a first switching state and a second switching state in response to a control input transmitted from the data bus subscriber to at least the first switch of the connection module, and
        connect the first input interface to the first output interface in the first switching state, and
        connect the first data connection interface to the first output interface in the second switching state,
    wherein the control input transmitted from the data bus subscriber to the connection module is sent after the data bus subscriber is ready to process or communicate.

2. The connection module according to claim 1, further comprising:
    a second data connection interface connectable to the data bus subscriber,
    wherein the first switch is adapted to connect the second data connection interface to the first input interface.

3. The connection module according to claim 1, wherein the local bus is a ring bus, and wherein the first input interface and the first output interface are adapted for passing process data, the data bus subscriber performing signal processing on the process data before passing the process data to the first output interface.

4. The connection module according to claim 1, wherein the first input interface has at least one releasable electrical contact for connection to the local bus and/or the first output interface has at least one releasable electrical contact for connection to the local bus.

5. The connection module according to claim 1, wherein the first data connection interface has at least one detachable electrical contact for connection to the data bus subscriber and/or wherein the second data connection interface has at least one releasable electrical contact for connection to the data bus subscriber.

6. The connection module according to claim 1, wherein the connection module has at least one mechanical connection element for connection to a further module unit, and wherein the first output interface of the module unit is electrically connectable to a first input interface of the further module unit or the first input interface of the module unit is electrically connectable to a first output interface of the further module unit.

7. The connection module according to claim 1, wherein the connection module has at least one further connection element for the mechanical connection to a data bus subscriber, wherein the first data connection interface and/or the second data connection interface are electrically connectable to the data bus subscriber.

8. The connection module according to claim 1, further comprising:
    a second input interface and a second output interface for connection to the local bus;
    a third and a fourth data connection interface for connection to the data bus subscriber; and
    a second switch adapted to:
        switch between a third switching state or a fourth switching state in response to the control input from the data bus subscriber, and
        connect the second input interface with the second output interface in the third switching state, and
        connect the third data connection interface to the second input interface and/or connect the fourth data connection interface to the second output interface in the fourth switching state.

9. The connection module according to claim 8, wherein the first switch and/or the second switch are electrically controllable for controlling the first switching state, and/or the second switching state and/or the third switching state and/or the fourth switching state.

10. The connection module according to claim 8, wherein the first switch and/or the second switch are adapted to assume the first switching state and the third switching state, if no control input is present or when no data bus subscriber is connected to the connection module.

11. The connection module according to claim 8, wherein the first switch and/or the second switch are adapted in the first switching state and/or the third switching state to connect the second data connection interface and/or the third data connection interface to a fixed potential.

12. The connection module according to claim 1, wherein the control input is a control signal or a binary control signal, and wherein in an event of an error at the data bus subscriber, the first switch of the connection module is changed to the first switching state.

13. The connection module according to claim 8, wherein the first switch and/or the second switch has at least one switch or a semiconductor switch.

14. The connection module according to claim 1, wherein the connection module further comprises a voltage connection interface for connecting a voltage source to the data bus subscriber, the connection module supplying voltage to the data bus subscriber.

15. The connection module according to claim 1, wherein the connection module further comprises a control input interface for receiving the control input from the data bus subscriber and/or for forwarding the control input to the first switch and/or to a second switch.

16. The connection module according to claim 1, wherein, in the second switching state, the first input interface connects, via the data bus subscriber, to another downstream data bus subscriber which is connected in the local bus with the data bus subscriber.

17. The connection module according to claim 1, wherein, in the first switching state, the first input interface connects, via the first output interface, to another downstream connection module which is connected in the local bus with the data bus subscriber.

18. The connection module according to claim 1, wherein, in a communication flow, the connection module receives first signals from the local bus and receives second signals from the data bus subscriber.

19. An apparatus for connecting a data bus subscriber to a local bus, the apparatus comprising:
- a first input interface and a first output interface connectable to the local bus;
- a first data connection interface connectable to the data bus subscriber; and
- a first switch adapted to:
  - switch between a first switching state and a second switching state in response to a control input from the data bus subscriber to the first switch, and
  - connect the first input interface to the first output interface in the first switching state, and
  - connect the first data connection interface to the first output interface in the second switching state,
- wherein the control input from the data bus subscriber to the apparatus is sent after the data bus subscriber is ready to process or communicate,
- wherein, in a communication flow, the apparatus receives first signals from the local bus and receives second signals from the data bus subscriber,
- wherein, in the second switching state, the first input interface of the apparatus connects, via the data bus subscriber, to another downstream data bus subscriber which is connected via the local bus with the data bus subscriber.

\* \* \* \* \*